(No Model.)
A. L. SAINT-AUBIN.
PROCESS OF AND APPARATUS FOR TREATING COFFEE.
No. 344,597. Patented June 29, 1886.
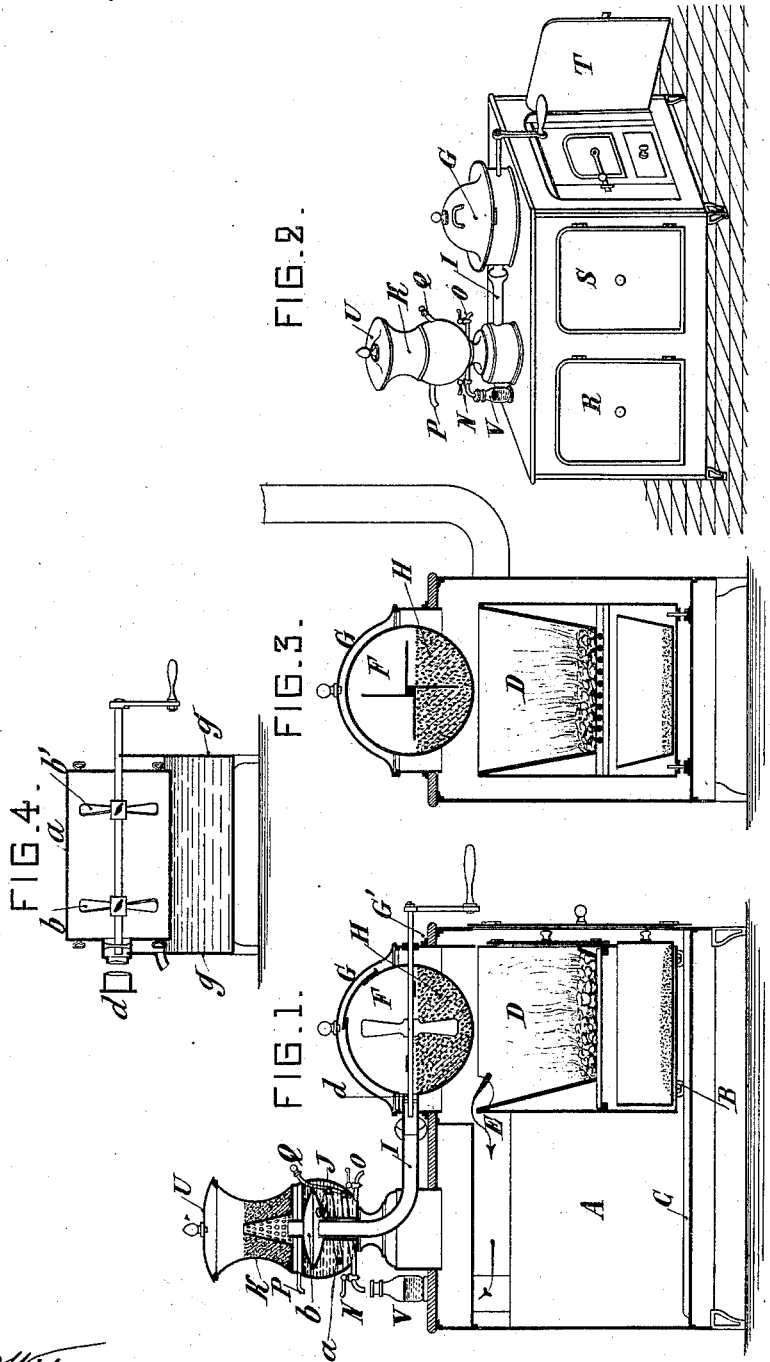
Witnesses:
A. Schehl
Harry M. Turk
Inventor:
A. L. Saint-Aubin
by his attorneys
Briesen & Steele

UNITED STATES PATENT OFFICE.

ANTOINE LOUIS SAINT-AUBIN, OF REIMS, FRANCE.

PROCESS OF AND APPARATUS FOR TREATING COFFEE.

SPECIFICATION forming part of Letters Patent No. 344,597, dated June 29, 1886.

Application filed April 5, 1886. Serial No. 197,785. (No model.) Patented in France November 9, 1885, No. 172,155.

*To all whom it may concern:*

Be it known that I, ANTOINE LOUIS SAINT-AUBIN, of the city of Reims, France, have invented a new and Improved Process of and Apparatus for Treating Coffee, of which the following is a full, clear, and exact description, and for which I have obtained Letters Patent in France, No. 172,155, dated November 9, 1885.

This invention relates to an improved process and apparatus for roasting and treating coffee without direct contact with the fire, by means of which the whole of the aroma is retained and the caffeine also extracted by distillation.

The essential feature of the invention consists in the particular arrangement of the different parts of the apparatus, which is represented, by way of example, in the accompanying drawings.

Figure 1 is a longitudinal vertical section of the roasting and distilling apparatus; Fig. 2, a perspective view, and Fig. 3 a cross-section, of the same. Fig. 4 represents the apparatus for cooling the coffee used in combination with the roaster.

A is a rectangular casing, in the interior of which is a furnace, D, of circular form, mounted on rollers B, running on rails C, and which is introduced into the casing at the door T. The furnace, which may be heated by gas or other fuel, is composed of an ash-pit, grate-bars, door, and sliding bottom for regulating the heat, whereby the coffee is roasted and the aroma distilled without causing the caffeine to undergo any change. The products of combustion pass out through the flue E.

F is a globular vessel provided with a sliding door and stirrer rotated by a winch-handle; I, pipe by which the aroma is conducted from chamber F, and *d* a diaphragm in the mouth of the pipe to prevent the berries choking the outlet, while allowing of a free escape for the vapors; G, cover of vessel F, made in two parts, opening outward. The pipe I is protected from the action of the heat, and is made in two parts, so as to facilitate the removal of the globular vessel F. It is also provided with a packing to prevent any loss of vapor.

J is a vessel kept filled with cold water, in which the coffee-essence is condensed. To prevent the condensation, and therefore the distillation, of the aroma being imperfectly effected in the event of too large a quantity of the essence being introduced into the condenser J, a worm-tube, *a*, is disposed in its interior, communicating with a chamber, *b*, of elliptical form, into which the vapors from the globular vessel F are introduced by pipe I. The distillation is effected, for the most part, in chamber *b*, the uncondensed vapors, passing into worm *a*, where the condensation is completed, the essence being drawn off by a cock, N, into a vessel, V, of any kind.

K is a vessel closed by a cover, U, at bottom of which is a perforated conical tube, open at top, and serving to concentrate the essence or dry vapor in the coffee contained in said vessel; O, emptying-cock of condenser; Q, feed-pipe by which cold water is introduced by means of a funnel, or it may be connected to a service or other cock. By means of this pipe the cold water at the bottom part of the condenser J is constantly renewed and forces the hot water out at top through the discharge-pipe P.

A space is provided in the casing A, closed by a door, R, either for holding a supply of coffee or for containing the cooler, Fig. 4. The side door, S, is for establishing a current of air beneath the vessel F, and for completing the distillation of the coffee, at which stage the furnace D is moved along the rails C away from beneath the globular roaster F.

Fig. 4 represents the apparatus for cooling the coffee, and at same time preserving its aroma, thus completing the treatment effected by the roaster. It consists of a cylinder, *a*, preferably of tin-plate, provided with a shaft having stirrers *b b'*, and mounted to rotate in a tank, *g*, filled with cold water, which is kept in constant circulation. The cylinder, which is filled with equal parts of cold coffee and hot coffee from the roaster, is rotated for a few moments, during which the temperature of the two coffees becomes equalized, the aroma of the hot coffee being absorbed by the cold coffee until the whole is completely cooled. The cylinder is filled and emptied by its mouth $c$, which is closed by a cap, $d$. This treatment forms the complement of the system of roasting, distillation, and concentration herein described.

I claim—

1. The combination, with a coffee-roaster, of a distillatory apparatus, into which the coffee-essence is introduced, consisting of a receiver placed in communication with a worm-tube immersed in water, and surmounted by a perforated tube rising in an upper vessel containing dry coffee, as hereinbefore described with reference to the accompanying drawings.

2. The herein-described process of treating coffee, which consists in extracting the essence from the vapors escaping from the roaster, and condensing and collecting a portion of the same by distillation, the remainder of the said vapors being concentrated in the dry coffee, and the treatment being afterward completed by the refrigeration of the coffee in a cylinder containing cold coffee, rotating in a tank filled with cold water in circulation, as and for the purpose specified.

The foregoing specification of my improved process of and apparatus for treating coffee signed by me this 8th day of March, 1886.

ANTOINE LOUIS SAINT-AUBIN.

Witnesses:
ROBT. M. HOOPER,
ALBERT MOREAU.